(No Model.)
D. P. SHARP.
TWO WHEELED VEHICLE.
No. 313,379. Patented Mar. 3, 1885.
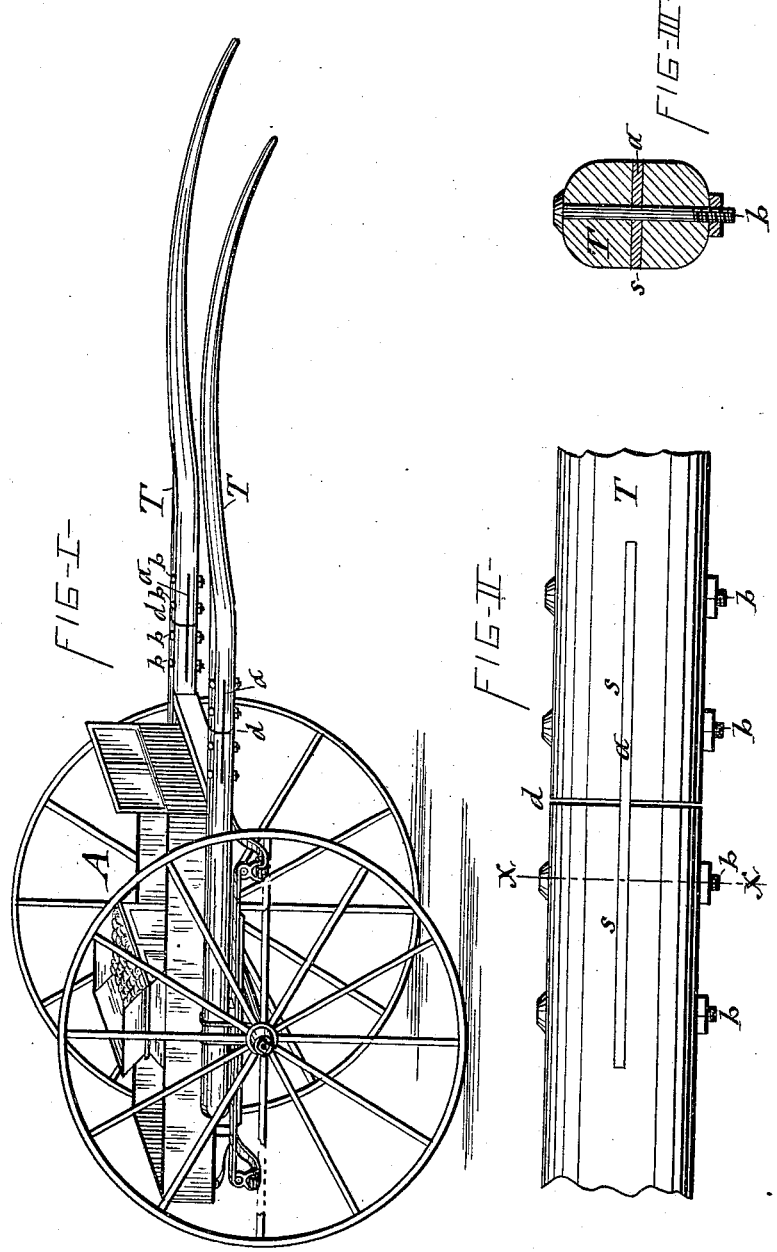
WITNESSES
C. Bendixon
Wm. C. Raymond
INVENTOR
Dennis P. Sharp
per Duell, Laass & Hey
his Attys

UNITED STATES PATENT OFFICE.

DENNIS P. SHARP, OF ITHACA, NEW YORK.

TWO-WHEELED VEHICLE.

SPECIFICATION forming part of Letters Patent No. 313,379, dated March 3, 1885

Application filed November 1, 1884. (No model.)

*To all whom it may concern:*

Be it known that I, DENNIS P. SHARP, of Ithaca, in the county of Tompkins, in the State of New York, have invented new and useful Improvements in Sulky-Shafts, of which the following, taken in connection with the accompanying drawings, is a full, clear, and exact description.

This invention relates to that class of sulky-shafts which are formed with a flexible joint for the purpose of overcoming the longitudinal rocking motion of the vehicle-body incident to the motion of the horse; and the invention consists in a novel construction of said flexible joint, all as hereinafter fully described, and specifically set forth in the claim.

In the annexed drawings, Figure I is a perspective view of a so-called "road-cart" embodying my improvement. Fig. II is an enlarged side view of that portion of the thill to which my invention is applied; and Fig. III is a transverse section on line $xx$, Fig. II.

Similar letters of reference indicate corresponding parts.

A represents a two-wheeled vehicle, which may be of any desired and well-known style and construction, and T T denote the thills or shafts attached to the said vehicle in any suitable manner, according to the style of the vehicle.

Various devices have been resorted to to overcome the longitudinal rocking motion of the vehicle-body incident to the motion of the horse hitched to the vehicle; but they generally entail too great expense in the manufacture of the vehicle and seldom accomplish the desired object.

One of the simplest means thus far employed for the aforesaid purpose is a flexible joint in the thills or shafts; but as hitherto constructed said joints failed to possess the requisite security of the connection of the parts and imparted to the thills such an awkward appearance as to render them unfit for a fine vehicle.

The object of this invention is to provide a thill with a flexible joint which shall securely connect the thill-sections, properly brace the same laterally, and most effectually conceal the spring by which the thill is spliced; and to that end I divide the thill T transversely at any suitable or convenient point between the attachment of the thill to the vehicle and the free end of the thill supported by the horse. In the drawings I have shown the division at $d$. The adjacent ends of the thill-sections I provide with horizontal longitudinal slits $s$ $s$, into which I insert a spring-steel plate, $a$, as best seen in Figs. II and III of the drawings, and by means of two or more bolts, $b$ $b$, passing vertically through each of the thill-sections and through the spring-plate $a$, the latter is securely retained in its position and tied to the thill. The side edges of the spring-plate $a$ being flush with the sides of the thill leaves the latter smooth on its exterior, and, when painted, the spring-plate is almost completely concealed. The thill is thus provided with a flexible joint, which yields to the jolting motion received from the horse and prevents the transmission of said motion to the vehicle, a slight space, as shown at $d$, being left between the adjacent ends of the thill-sections to permit of the aforesaid deflection of the thill, and the division of the thill is in a vertical plane, so that excessive deflection of the thill is arrested by the abutment of the adjacent end faces of the thill-sections.

I do not claim, broadly, a thill provided with a flexible joint, as I am aware the same is not new; but I do claim specifically—

In combination with a two-wheeled vehicle, a thill divided transversely at a point between the attachment of the thill to the vehicle and the support of its free end, horizontal longitudinal slits in the adjacent ends of the thill-sections, a spring-plate inserted in said slits, and fastenings for holding said plate in place and tying the same to the thill, substantially as described and shown, for the purpose set forth.

In testimony whereof I have hereunto signed my name and affixed my seal, in the presence of two attesting witnesses, at Syracuse, in the county of Onondaga, in the State of New York, this 21st day of October, 1884.

DENNIS P. SHARP. [L. S.]

Witnesses:
 FREDERICK H. GIBBS,
 C. BENDIXON.